United States Patent [19]

Rautenberg et al.

[11] Patent Number: 4,761,324

[45] Date of Patent: Aug. 2, 1988

[54] ELASTIC, LAMINATED, WATER-PROOF, MOISTURE-PERMEABLE FABRIC

[76] Inventors: Leonard J. Rautenberg, West Creek Farms Rd., Sands Point, N.Y. 11050; Milton M. Gilbert, 19 Susan Ter., Waterford, Conn. 06385; James H. Wyner, 24 Holyoke St.-Apt. #2; Daniel M. Wyner, 7 Holyoke St.-Apt. #5, both of Boston, Mass. 02138-4519

[21] Appl. No.: 68,907

[22] Filed: Jun. 24, 1987

[51] Int. Cl.⁴ .......................... B32B 3/26; B32B 7/14
[52] U.S. Cl. .................................. 428/198; 428/219; 428/220; 428/230; 428/231; 428/317.1; 428/317.7
[58] Field of Search ............... 428/198, 219, 220, 230, 428/317.1, 317.7

[56] References Cited

U.S. PATENT DOCUMENTS

| | | | |
|---|---|---|---|
| 2,485,725 | 10/1949 | Francis, Jr. | 428/231 |
| 2,628,928 | 2/1953 | Cadous | 428/231 |
| 3,219,039 | 11/1965 | Ambrose et al. | 428/231 |
| 3,666,595 | 5/1972 | Bauer | 428/198 |
| 4,187,390 | 2/1980 | Gore | 428/320.2 |
| 4,539,255 | 9/1985 | Sato et al. | 428/317.7 |

*Primary Examiner*—William J. Van Balen
*Attorney, Agent, or Firm*—Darby & Darby

[57] ABSTRACT

A laminated elastic fabric. The laminate includes a layer of stretch material having substantial elastic qualities, a polymer film layer being breathable, water-resistant and having elastic qualities, and an adhesive present in substantially discontinuous segments bonding said film layer to said material.

12 Claims, 2 Drawing Sheets

ELASTIC, LAMINATED, WATER-PROOF, MOISTURE-PERMEABLE FABRIC

FIELD OF THE INVENTION

The present invention relates to elastic fabrics and, in particular, laminated elastic fabrics which are water-proof or water-resistant but which have the ability to pass moisture vapor therethrough.

BACKGROUND OF THE PRESENT INVENTION

A variety of laminated fabrics are known which offer water-resistant or water-proof qualities and breathability as measured by ability to pass moisture vapor. Many of these laminated fabrics are not of the elastic kind or only offer a marginal amount of elasticity.

A water-resistant, breathable laminate is described in U.S. Pat. No. 4,187,390. That patent describes a laminate made from polytetrafluorethylene (PTFE) polymer film bonded to a substrate. A wearable fabric using such a bonded laminate is sold under the trademark GORE-TEX. Such fabric has been used in construction of outerwear garments which are water-resistant but also allow perspiration of the wearer to evaporate in the form of water vapor which can readily pass through the garment. GORE-TEX fabrics are not considered elastic fabrics, nor are they conducive to use in garments requiring good drape and feel of the fabric.

One laminated fabric offering breathability and water-resistant qualities which also attempts to provide an increased amount of elasticity is disclosed in U.S. Pat. No. 4,539,255. That patent describes a moisture-permeable, water-proof fabric which comprises a polyamino-acid-modified polyurethane film having a thickness of 2 to 20 microns and a fabric bonded onto the film by a polyurethane adhesive. The laminate disclosed in that patent employs a continuous adhesive layer which is cured by heating. However, products produced by this technique may be unsatisfactory in drape, feel and elasticity. In addition, the adhesive layer may limit breathability of the fabric.

It is accordingly an object of the present invention to provide a laminated fabric which is breathable, water-proof or water-resistant, and also has substantial elasticity.

It is another object of the present invention to provide a laminated fabric having a layer of stretch material as a substrate with a thin polyurethane film bonded thereto, with the laminated fabric having excellent drape and feel and having overall elastic characteristics approaching that of the stretch material.

It is a further object of the present invention to provide a breathable, water-proof or water-resistant, laminated fabric with little tendency to deteriorate by delamination during ordinary use including machine washing and dry cleaning.

SUMMARY OF THE PRESENT INVENTION

In accordance with the invention, a laminated elastic fabric comprises a layer of stretch material with substantial elastic qualities and a polymer film layer having a thickness less than about 1.0 mil. The film is breathable and water-proof and has elastic qualities comparable to those of the stretch material. An adhesive bonds the film to the stretch material, the adhesive being provided in substantially discontinuous adhesive segments.

Also in accordance with the invention, a method for producing a breathable, water-proof laminated fabric comprises the steps of providing a first layer of an elastomeric film which is breathable and water-proof having a predetermined thickness up to 1.0 mil, providing a second layer of a stretch material, elongating the first layer a predetermined amount in the longitudinal direction, elongating the second layer an amount in the longitudinal direction to substantially match the elongation of said first layer, applying an adhesive at substantially discrete areas of one of the layers so as to form adhesive segments thereon, pressing together the layer without the adhesive and the layer to which the adhesive is applied while the elongation of said two layers is matched to bond the layers so as to form a laminate, and curing the adhesive applied to the laminated fabric while maintaining a longitudinal tension on the layers.

As used in this application:

"water-proof" shall be deemed to include "water-resistant";

"matching" the amounts of elongation in the laminate layers ordinarily means that each layer is elongated by the same % amount. This is done so that the two layers will bond as desired, i.e., without irregularities such as curling or puckering. The possibility also exists, however, that the amount of elongation of the layers might differ so as to produce intentional irregularities on the laminate (such as a crepe-like effect).

For a better understanding of the present invention, reference is made to the following description and accompanying drawings, while the scope of the present invention will be pointed out in the appended claims.

DESCRIPTION OF THE PREFERRED EMBODIMENTS

Figure 1:
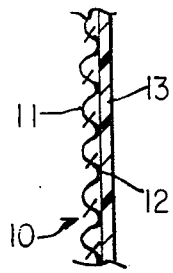
FIG. 1 illustrates, in cross-section, an elastic laminated fabric in accordance with the invention.

Referring initially to FIG. 1, shown there is an elastic fabric 10 constructed as a laminate from two layers, each having elastic properties. One of the layers is the stretch (woven, non-woven or knit) fabric substrate 11 while the other layer is a stretchable thin film 13 made of an elastomeric polymer. The two layers are bonded together by an adhesive 12 in a manner to be described in detail below. The bonding procedure allows the permanent attachment of a very thin film layer to the stretch material substrate in a manner which substantially prevents deterioration of the laminated fabric with use and which enables a resultant fabric to be produced which has excellent drape, feel and wear qualities.

The preferred film layer 13 is made from a polyurethane polymer having a predetermined thickness to assure breathability and elasticity. The film also has a high resistance to water penetration. Suitable polyurethane films are the types produced by Deerfield Urethane, Inc. of South Deerfield, Mass., particularly the proprietary type designated DUREFLEX PT 6100S. This film is a polyether-modified polyurethane. Typical properties of this film include an elongation (ASTM 882) of 450% and a tear strength (ASTMD 1044) of 400 lbs/inch.

Applicant has found that thickness of this film having a range of 0.6 mils to 1.0 mils will provide a satisfactory measure of breathability and elasticity together with resistance to water penetration. When the thickness of the film is chosen to be approximately 0.8 mils, the film achieves particularly good breathability, elasticity and water-proof qualities. In the following discussion, when film layer 13 is discussed, it is one having the preferred thickness of 0.8 mils.

The preferred polyurethane film behaves as one which is microporous in structure, that is, one where the pores are sufficiently large to provide breathability, sufficiently small to provide high water-resistance. The film also has excellent elastic qualities. One test of the film bonded to a stretch material permitted elastic deformation up to 160% before rupturing.

The stretch fabric substrate 11 may be woven, knitted or non-woven. The stretch fabric is typically composed of a hard fiber yarn and a spandex yarn. An example of a stretch fabric, particularly suitable as a substrate, is one made on a warp knit machine. The yarns employed in the material in this example are preferably nylon and spandex.

The stretch material in one example has the following construction details:

TABLE I

CONSTRUCTION DETAILS

| Gauge | 64 | Pattern | Bar 1 Nylon 1-1/2-3/2-2//1-0// |
| --- | --- | --- | --- |
| | | | Bar 2 Nylon 1-0/1-1/1-2/1-1// |
| # of Bars | 3 | Stitches/Repeat | Bar 3 Spandex 0-0/1-1/2-2/1-1// |
| | | | 4 |
| Knit Width | 167.8" | Knit Quality | 5.3 Inches/Rack |

| Bar | Yarn | Ends | Runner | Lbs./C yds | % |
| --- | --- | --- | --- | --- | --- |
| 1 | 40-13 R25 S.D. Nylon | 5368 | 27.50 | 49.54 | 51.9 |
| 2 | 40-13 R25 S.D. Nylon | 5368 | 17.60 | 31.71 | 33.2 |
| 3 | 140 Denier Spandex | 5368 | 3.30 | 14.24 | 14.9 |

The finished fabric specifications of this example of the stretch material are as follows:

TABLE II

FINISHED FABRIC SPECIFICATIONS

| Wales/Inch | 45 | (43–45) | Oz/Sq Yd | 4.5 ± 5% |
| --- | --- | --- | --- | --- |
| Stitches/Inch | 180 | (176–184) | Hole Count | 44–46 |
| Shrink Warp | 2.0% | | | |
| Shrink Side | 4.0% | | | |
| Finished Quality | 2.67 | | | |
| IP4 Warp | 210–220% | | Side | 85–95% |

| Modulus | Out Curve | Return Curve |
| --- | --- | --- |
| 20% | .30–.50 lbs. | .00–.00 lbs. |
| 30% | .40–.60 lbs. | .00–.00 lbs. |
| 40% | .50–.70 lbs. | .00–.00 lbs. |
| 60% | .50–.70 lbs. | .00–.00 lbs. |
| 70% | .60–.80 lbs. | .00–.00 lbs. |
| 80% | .60–.80 lbs. | .00–.00 lbs. |

IP4 Conditions: 3 × 3 Cycles at 30 lbs. effective weight.

After knitting, the fabric is relaxed, dyed and finished in accordance with standard stretch fabric techniques.

The technique for bonding the two layers together is of great importance to the resultant quality of the laminated fabric. A preferred adhesive utilized in the bonding of the layers is a cross-linkable, two-part polyurethane which can be cured at room temperature. The first part or main polymer of the preferred adhesive includes free hydroxyl groups. This polymer is preferably solvent-based, such that 35–40% solids by weight of the polymer is dissolved in the solvent. A preferred solvent is a non-flammable chlorinated solvent such as trichloroethylene.

The second part of the adhesive is an isocyanate which is preferably solvent-based, such that 65–75% solids by weight is dissolved in the solvent. The preferred solvent is the same as that of the main polymer. Approximately 11–13% by weight of the isocyanate has active NCO terminations, which functions as an adduct.

The two parts are mixed in an approximate ratio of 1 part isocyanate solution to 4 to 5 parts main polymer solution. The resultant mixed adhesive preferably is about 45% solids by weight. A 100% solids adhesive may also be employed.

It is also possible to use a one-part urethane adhesive which is moisture cured. To be avoided are adhesives which cure at such elevated temperatures as may damage the stretch substrate yarns.

It is essential that a minimal amount of adhesive be employed in the bonding. A general range of 1 to 20 g/m² of the cured adhesive is within the scope of the invention although the preferred range is 6 to 10 g/m².

Equally important is that the application of the adhesive to a layer be made substantially discontinuously so as to avoid a solid layer of adhesive between the film and the substrate. A continuous layer is deleterious to the moisture vapor transmission through the laminate as well as to the drape and feel of the fabric. The preferred technique of applying the adhesive will result in relatively small amounts being distributed in discrete areas when the adhesive is cured.

Various patterns may be appropriate such that they will form substantially discontinuous adhesive segments on either fabric or film. Selection of the adhesive pattern is dependent on the surface characteristic of the fabric. Typical adhesive patterns are dots, tri-helical, quad and cross hatch, however, other patterns may also be appropriate.

Figure 4A:
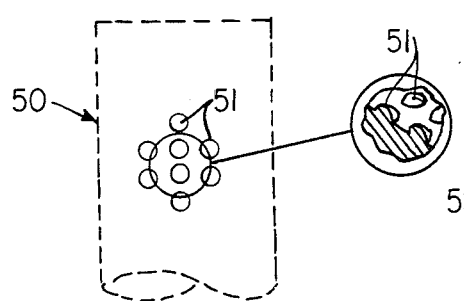
FIGS. 4a, b, c and d represent typical roller designs for application of the adhesive in forming the laminated fabric.
Figure 4B:
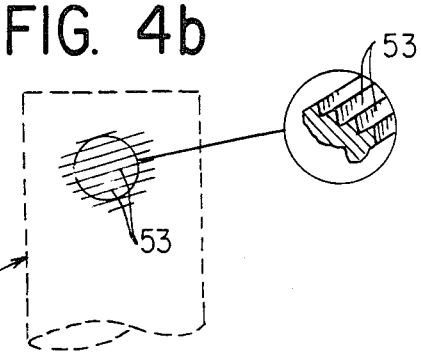
Figure 4C:
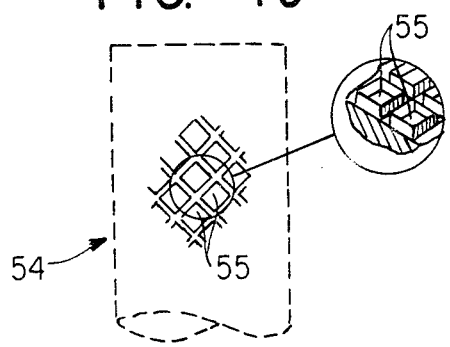
Figure 4D:
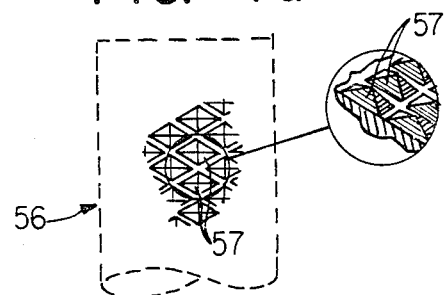
Figure 5:
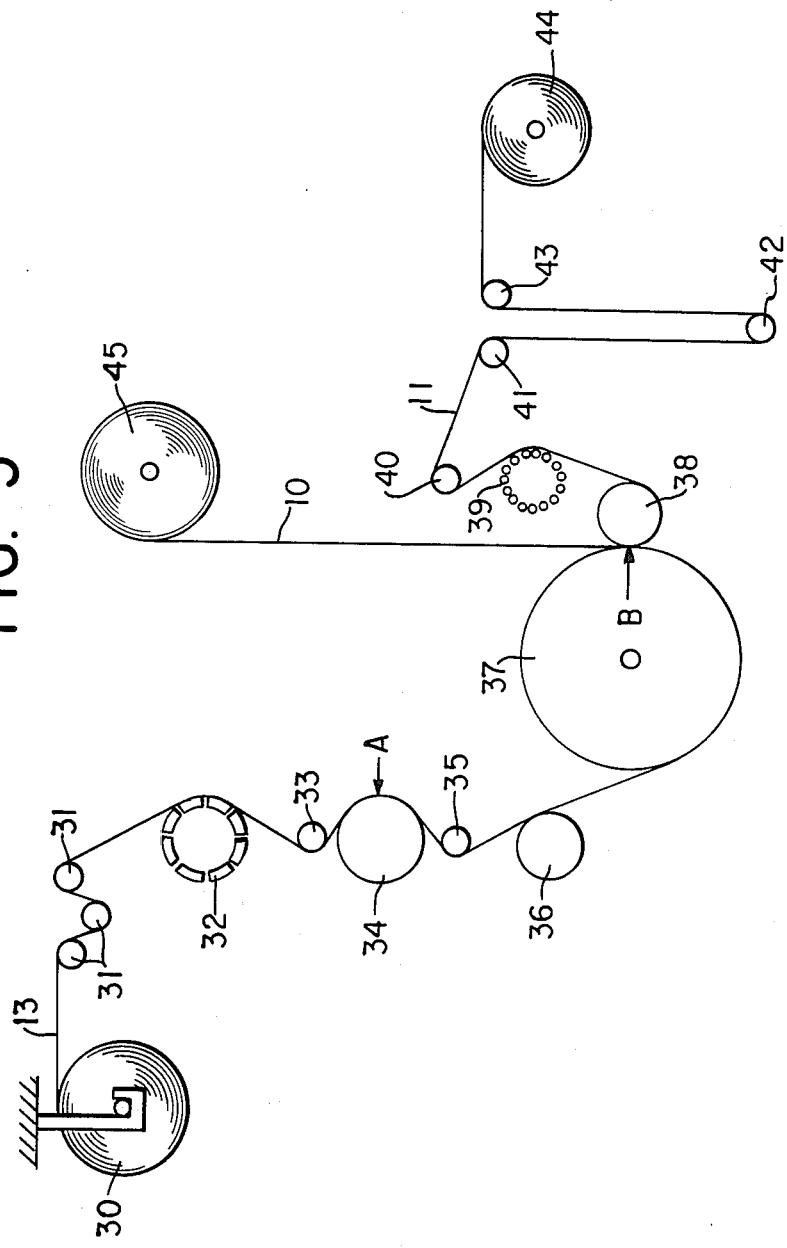
FIG. 5 illustrates, in schematic form, a typical mechanical configuration for making the laminated fabric of the present invention.

The four types of designs mentioned above are indicated by the depiction of rollers for applying the adhesive as shown in FIGS. 4a–d. In FIG. 4a, the roller 50 (typically 6 feet long) includes a plurality of semi-spherical depressions or dimples 51 for retaining the applied adhesive. The roller 50 will produce a dot pattern. FIG. 4b illustrates a ridged roller 52 where the ridges 53 wrap around the roller in a helical fashion. The applied adhesive nests in the valleys between the ridges. FIG. 4c depicts a roller 54 with contiguous diamond-shaped depressions 55. The walls of each element 55 prevent adhesive from being applied at the tops of the walls. FIG. 4d shows a roller 56 with a cross-hatched pattern employing pyramid-type elements 57.

The adhesive pattern is to be chosen, for example, so that if the stretch substrate has raised points (e.g., a ribbed fabric), the adhesive is not applied to the raised points. The adhesive is applied preferentially to the portions of one layer that come in contact with the surface of the other layer. Most preferably the adhesive segments will be applied preferentially on fibers of the substrate (upon stretching of both layers and prior to pressing the layers together) or on the film layer at points or segments opposite from fibers (and not cords) of the substrate. To that end, the adhesive segments are preferably completely discrete and arranged in a pattern on one layer that either fits the fibers of the substrate layer or, when applied to the film, that opposes the fibers of the other layer. The adhesive may be applied by conventional gravure or screen printing and other such techniques using a doctor blade to fix the adhesive thickness. The pattern selected also depends on whether the adhesive is applied to the film or the substrate.

In contrast to prior art laminates which apply the adhesive in layer form, the application of the adhesive in small amounts discontinuously minimizes the importance of employing an elastic adhesive. An elastic adhesive, however, is preferred. Particularly preferred is an adhesive exhibiting at least about 150% elongation to the breaking point. It should be emphasized, however, that the laminated fabric depends for its elastic qualities primarily on the film and the stretch substrate, the elasticity of the adhesive being useful in assuring satisfactory drape and avoiding puckering.

The adhesive may be applied to either layer but is generally applied to the layer which tends to resist stretching the most. Generally, a predetermined % of an elongation is provided to the layer to which the adhesive is to be applied, particularly in the longitudinal direction. In general, the % of elongation or tension of the two layers are matched at the time the layer with applied adhesive is brought against the other layer. This may be done laboriously by calculation and hand adjustment, however, the provision of a machine to control overfeed and underfeed of one layer relative to the other is preferred. Either technique matches the % of elongation of the layer to which the adhesive is applied to the other layer. The use of the overfeed/underfeed on the machine also enables the operator to prevent curling (produced by mismatched tension or % of elongation) by observing to which side the resultant fabric curls and by increasing the amount of stretch to compensate.

Referring to FIG. 4, a typical configuration for constructing a laminated elastic fabric in accordance with the invention is shown. In this configuration, the adhesive is applied to the film 13, however, it should be understood that the adhesive may be applied to the stretch fabric instead.

A roll 30 of polyurethane film 13 provides a supply of the film over intermediate rolls 31, slat expander 32, intermediate roller 33, driven rubber roll 34, intermediate roll 35, applicator roll 36 and large diameter roll 37 to point B. The applicator roll 36 applies the adhesive to one side of the layer 13 according to a predetermined pattern on the roll.

A roll 43 of stretch fabric 11 provides a supply of the fabric over rolls 43, 42, 41 and 40, driven Menzel roll 39 and small diameter roll 38 to point B. Roll 42 is the dancer roll. Roll 43 is driven by a dancer controlled motor. In one configuration, approximately 11 pounds of force were put on the dancer. This will cause the stretch fabric to elongate by a % determined by the nature of the fabric.

At point B, the film layer bearing the discontinuously applied adhesive is pressed against the stretch fabric and fed as a laminate to roll 45 where it is rolled prior to curing the adhesive. An elongation of the film occurs between point A on the driven rubber roll to point B which is varied within a range usually between 8% and 20% to match the recovery of the stretch fabric.

In general, the width-wise tensions or "elongation" of width are maintained at a minimum, just sufficient to keep longitudinal wrinkles from appearing.

Subsequent to bonding, the laminate is rolled up smoothly and tightly, preferably under the same tension as applied during the matching of the two layers, to make sure there is no unintended wrinkling, bubbling or any tendency to apply stress to the adhesive until it is fully cured. The rolled up laminate is allowed to cure in the roll for a minimum of one hour, but typically up to 24 hours under carefully controlled humidity and ambient temperature.

The cured adhesive will become at least 75% and preferably 95% cross-linked in 24 hours. With curing for an additional 24–48 hours, the laminate will become 100% cured. These values are reasonable estimates since curing rate is moisture- and temperature-dependent. With this degree of crosslinking, ordinary use of this bonded fabric, including washing, dry cleaning and vigorous wear, will not cause the fabric to delaminate.

One example of the laminated elastic fabric (polyurethane film bonded to a knitted stretch substrate) had a moisture vapor transmission (MVT) at 72° F. of about 320 (g/24 hrs. $m^2$) when tested. However, when the temperature was increased to approximately body temperature (92° F.), the MVT almost trebled (825 g/24 hrs. $m^2$). This is a particularly desirable characteristic for fabrics employing such a film which will be worn close to the body. This test was conducted in accordance with ASTM E 96.

The fabric has also been tested for hydrostatic resistance using the standard Mullen test. The average of a series of such tests was 70.4 lbs/sq. in. Both the MVT and hydrostatic resistance tests were conducted with fabric stretched to 22.5% ±2.5% in the warp direction.

Figure 2A:
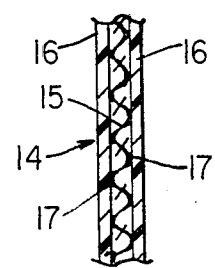
FIGS. 2a and 2b illustrate, in cross-section, embodiments of elastic laminated fabric with three layers in accordance with the present invention.
Figure 2B:
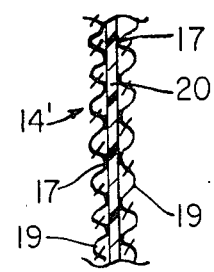

FIGS. 2a and 2b illustrate another embodiment of the present invention. In this embodiment, there are three layers to the fabric and the resultant fabric is called a trilaminate. The trilaminate 14 may either comprise a center film layer 20 with two outer layers of stretch material 19, as shown in FIG. 2b, or the center layer may be the stretch layer 15 and the outer layers may be the film material 16, as shown in FIG. 2a. The trilaminate is prepared by two separate bonding steps, each step equivalent to that previously described. The bond is shown in FIGS. 2a and 2b as 17.

Figure 3:
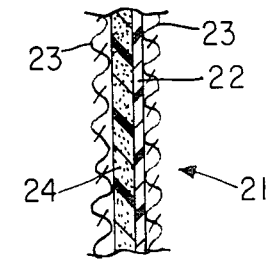
FIG. 3 illustrates, in cross-section, a further embodiment of an elastic laminated fabric in accordance with the present invention.

A multilaminate film 21 may also be constructed in the manner shown in FIG. 3. There, an additional polyurethane foam layer 24 is added between outer layers of the stretch fabric 23 adjacent to the film layer 22. Suitable polyurethane foams are the types produced by General Foam Corporation, Paramus, N.J. particularly the proprietary types designated in a "4000 Series". A typical property of this foam is the porosity (ASTM D 3574-86 Test G) of 0.4–1.0 cubic feet/minute. The preferred foam layer is a urethane polyester or polyether foam with a thickness of the thinnest peelable up to 0.25 inches. A preferred thickness is 0.25 inches. The most preferred density is 1.7 lbs/ft.$^3$. The cell count ranges from 25 to 65 with 30–50 being preferred. The various layers are bonded sequentially in the manner described above.

The final elastic fabric is the result of the bonding of a thin elastomeric film to a stretch material by extremely small and discrete quantities of adhesive. This is done without distortion or overtension by controlling the overfeed and underfeed of one layer relative to the other. The applied adhesive is allowed to cure at room temperature.

The laminated fabric is a soft, stretchable fabric with excellent drape which, because of the very thin film layer and minimal application of adhesive, has characteristics approaching the characteristics of the stretch fabric. Because of the nature of the film, stretch material and bonding techniques of the present invention, a breathable, water-proof, elastic laminated fabric having excellent wear characteristics is produced. The laminated fabric may also be machine washed and dry cleaned with no substantial danger to the integrity of the fabric.

While the foregoing description and drawings represent the preferred embodiments of the present invention, it will be obvious to those skilled in the art that various changes and modifications may be made therein without departing from the true spirit and scope of the present.

What is claimed is:

1. A laminated elastic fabric comprising:
   a layer of stretch material having substantial elastic qualities;
   a polymer film layer having a thickness less than 1.0 mil, said film layer being breathable and water-resistant and having elastic qualities comparable to said stretch material; and
   an adhesive bonding said film layer to said layer of stretch material, said adhesive being present in substantially discontinuous segments.

2. The laminated elastic fabric of claim 1, wherein said adhesive is present in amounts in the range of 1-20 $g/m^2$.

3. The laminated elastic fabric of claim 1, wherein said adhesive is present in amounts in the range of 6-10 $g/m^2$.

4. The laminated elastic fabric of claim 1, wherein said adhesive is a cross-linked polyurethane adhesive.

5. The laminated elastic fabric of claim 1, wherein said adhesive is curable at normal ambient temperatures.

6. The laminated elastic fabric of claim 1, wherein the polymer film is a polyurethane film.

7. The laminated elastic fabric of claim 6, wherein the film is a polyether polyurethane.

8. The laminated elastic fabric of claim 1, wherein the film has a thickness of approximately 0.8 mils.

9. The laminated elastic fabric of claim 4, wherein the adhesive is a two-part adhesive having a main polymer with free hydroxyl groups and an isocyanate with 11-13% cross linking NCO terminations.

10. A laminated elastic fabric according to claim 1, including an additional layer of stretch material bonded to said film layer, said adhesive bonding said additional layer of stretch material being present in substantially discontinuous segments.

11. A laminated elastic fabric according to claim 1, including an additional polymer film layer bonded to said layer of stretch material, said adhesive bonding said additional film layer being present in substantially discontinuous segments.

12. A laminated elastic fabric according to claim 1, including a layer of polyurethane foam bonded to said film and another layer of stretch fabric bonded to said foam layer, said foam layer and other layer of stretch fabric being bonded by adhesive present in substantially discontinuous segments.

* * * * *

REEXAMINATION CERTIFICATE (1462nd)
United States Patent [19]
Rautenberg et al.

[11] B1 4,761,324
[45] Certificate Issued May 7, 1991

[54] ELASTIC, LAMINATED, WATER-PROOF, MOISTURE-PERMEABLE FABRIC

[75] Inventors: Leonard J. Rautenberg, Sands Point, N.Y.; Milton M. Gilbert, Waterford, Conn.; James H. Wyner; Daniel M. Wyner, both of Boston, Mass.

[73] Assignee: Dash Partners, New York, N.Y.

Reexamination Request:
No. 90/002,083, Jul. 2, 1990

Reexamination Certificate for:
Patent No.: 4,761,324
Issued: Aug. 2, 1988
Appl. No.: 68,907
Filed: Jun. 24, 1987

[51] Int. Cl.$^5$ ............................ B32B 3/26; B32B 7/14
[52] U.S. Cl. ............................ 428/198; 428/219; 428/220; 428/230; 428/231; 428/317.1; 428/317.7
[58] Field of Search ............... 428/198, 219, 220, 230, 428/231, 317.1, 317.7

[56] References Cited
U.S. PATENT DOCUMENTS

| | | | |
|---|---|---|---|
| 3,817,818 | 6/1974 | Riding et al. | 428/224 |
| 4,429,000 | 1/1984 | Naka et al. | 428/265 |
| 4,483,900 | 11/1984 | Goldfarb | 428/262 |
| 4,686,137 | 8/1987 | Ward et al. | 428/290 |

OTHER PUBLICATIONS

Tuftane TM Product Literature (referred to in the '818 patent).
Bion II Product Literature (understood to be the '137 patent materially).
Dureflex Product Literature.
Porelle Product Literature.
AATCC Proceedings (J. L. Wyner).
Hosiery Trade Journal (J. L. Wyner)–Oct. 1968.
Coating and Laminating Machines (H. L. Weiss)–1977.

*Primary Examiner*—William J. Van Balen

[57] ABSTRACT

A laminated elastic fabric. The laminate includes a layer of stretch material having substantial elastic qualities, a polymer film layer being breathable, water-resistant and having elastic qualities, and an adhesive present in substantially discontinuous segments bonding said film layer to said material.

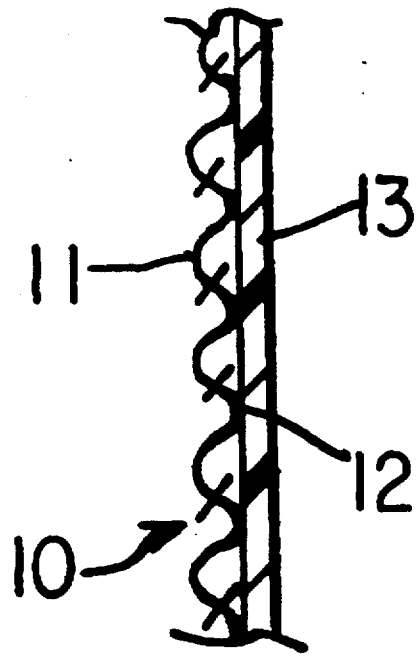

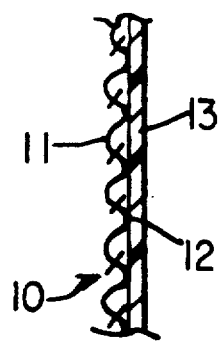

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *